US007274405B2

(12) United States Patent
Mori et al.

(10) Patent No.: US 7,274,405 B2
(45) Date of Patent: Sep. 25, 2007

(54) CABLE EXTENSION UNIT

(75) Inventors: Masafumi Mori, Tokyo (JP); Sei Murayama, Tokyo (JP)

(73) Assignee: Kowa Company, Ltd., Aichi-Ken (JP)

( * ) Notice: Subject to any disclaimer, the term of this patent is extended or adjusted under 35 U.S.C. 154(b) by 829 days.

(21) Appl. No.: 10/772,062

(22) Filed: Feb. 4, 2004

(65) Prior Publication Data

US 2004/0213456 A1 Oct. 28, 2004

(30) Foreign Application Priority Data

Apr. 28, 2003 (JP) ............................. 2003-124187

(51) Int. Cl.
  *H04N 7/08* (2006.01)
  *G06F 15/16* (2006.01)
  *G09G 5/00* (2006.01)
(52) U.S. Cl. ...................... 348/484; 348/552; 709/236; 345/213
(58) Field of Classification Search ................ 348/552, 348/705, 706, 722, 553, 484; 710/104–106, 710/300; 439/578; 345/213, 520, 168, 2.1; 725/105, 78, 151, 153; 709/230–235, 238–240
See application file for complete search history.

(56) References Cited

U.S. PATENT DOCUMENTS 5,760,842 A * 6/1998 Song .......................... 348/564
5,926,174 A * 7/1999 Shibamiya et al. ......... 345/213
6,160,543 A    12/2000 Chen ......................... 345/213
6,724,012 B2 *  4/2004 Kimura ....................... 257/72
7,145,609 B2 * 12/2006 Kim ............................ 348/705
2003/0147013 A1 *  8/2003 Martin ....................... 348/706
2004/0027486 A1 *  2/2004 Fujiwara et al. ........... 348/557
2006/0234546 A1 * 10/2006 Mori ....................... 439/540.1

OTHER PUBLICATIONS

*Extron Electronics, website home* pp. 1-4, dated May 24, 2004, titled "Twisted Pair Interface/composite Video and Audio Transmitter".

* cited by examiner

*Primary Examiner*—Victor R. Kostak
(74) *Attorney, Agent, or Firm*—Duane Morris LLP

(57) ABSTRACT

Synchronous signal overlapping and outputting means and sound signal transmitting means of a signal transmitter transmit any color signal which synchronous signals overlapped and the other color signals, and a sound signal on which polarity information of the synchronous signals was added through four signal lines to a signal receiver, respectively. Synchronous signal recovering and outputting means of the signal receiver recovers the synchronous signals on the basis of the synchronous signals separated from the color signal with the polarity information and outputs the signals to an image output unit. Then, it is possible to output sounds together with images inputted from the image inputting source from the image outputting unit with only four signal lines.

5 Claims, 5 Drawing Sheets

FIG.2
(a)
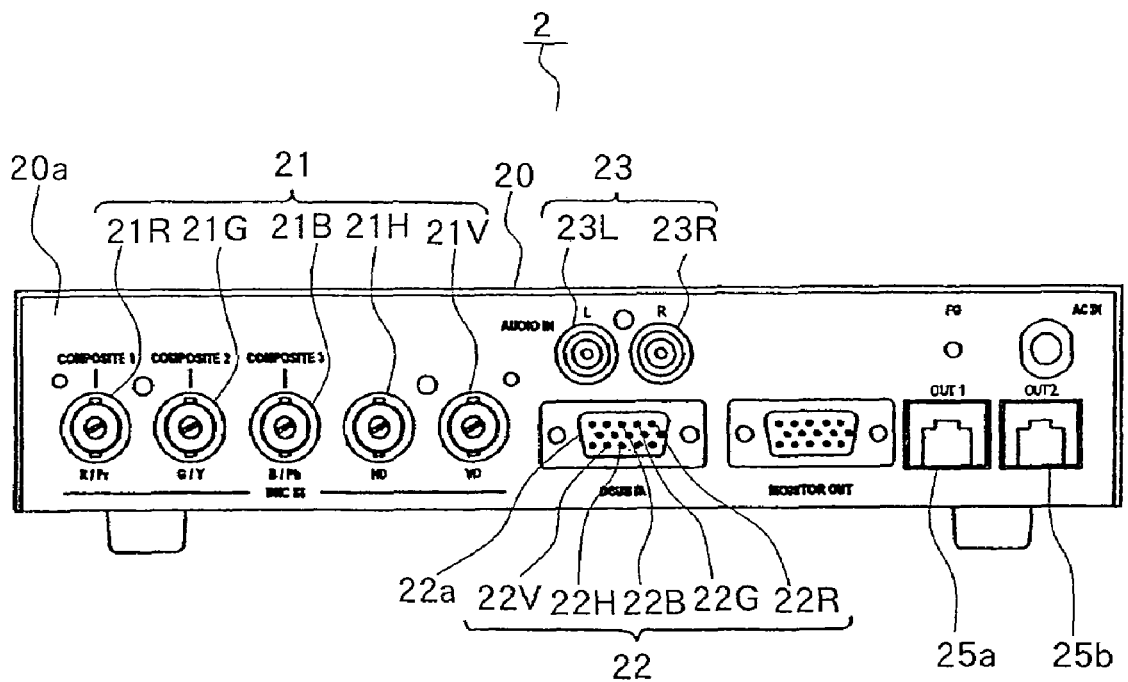
(b)
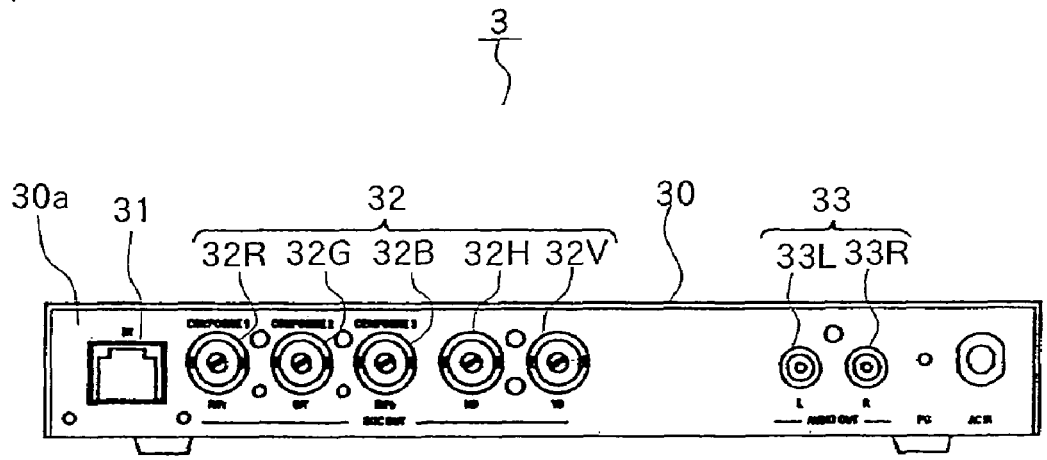

FIG. 4
(a) 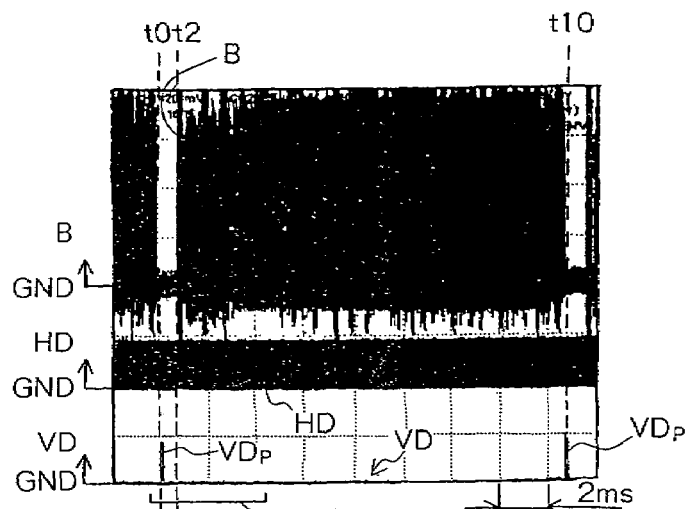
(b) 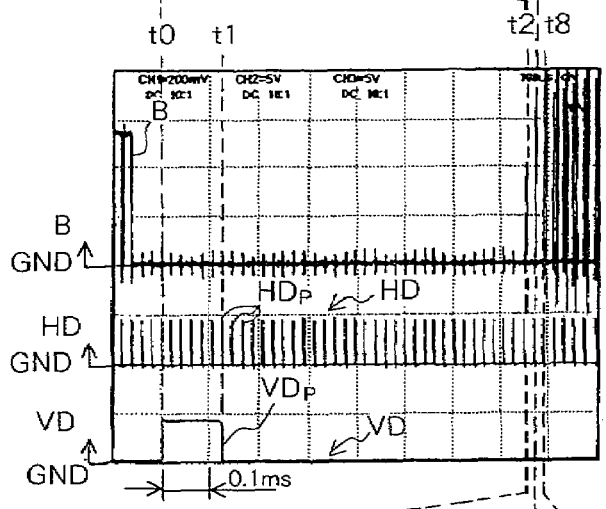
(c) 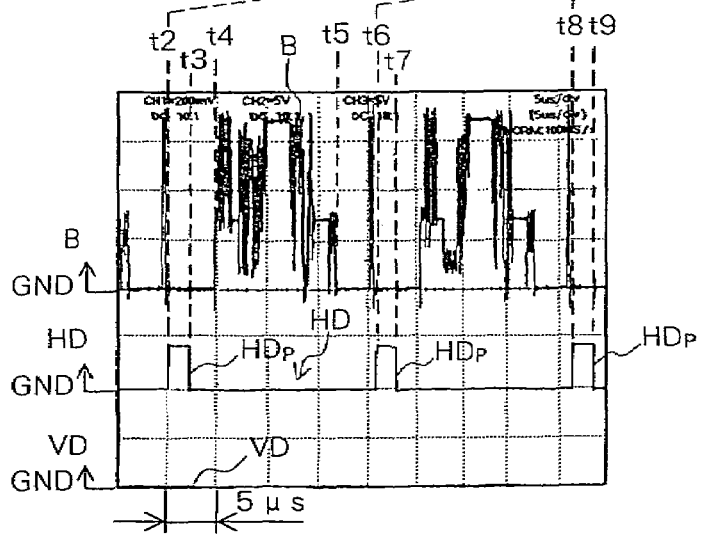

FIG.5
(a)
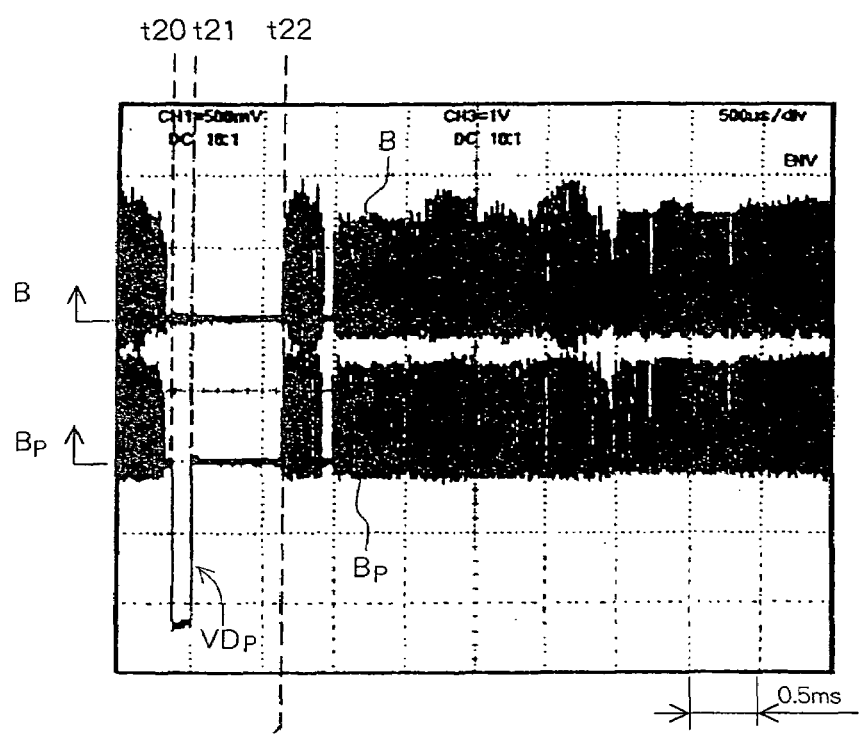
(b)
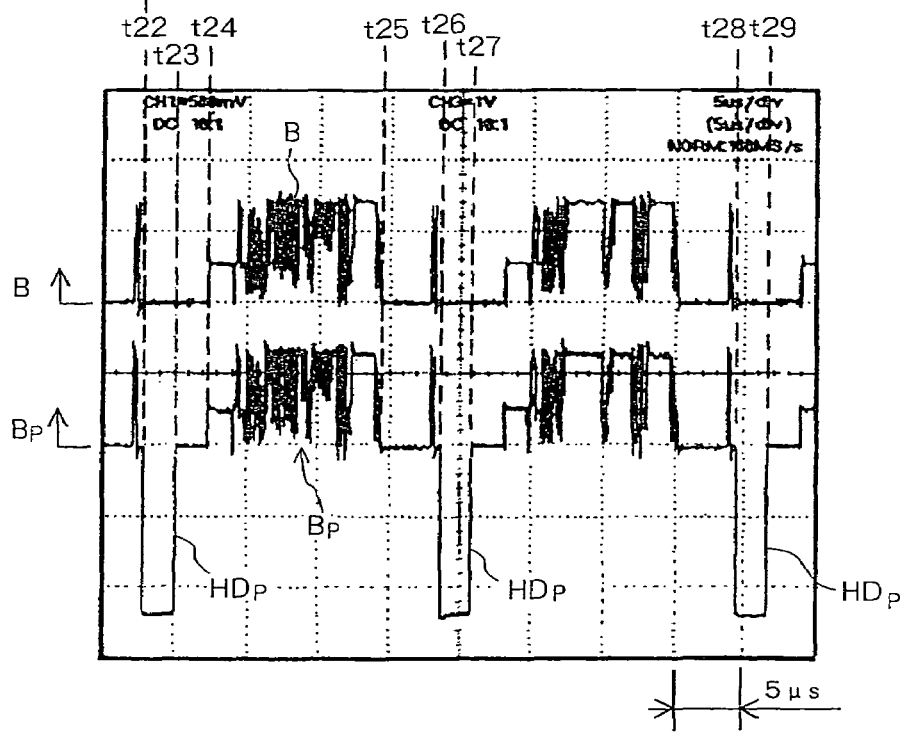

CABLE EXTENSION UNIT

BACKGROUND OF THE INVENTION

This invention relates to a cable extension unit for displaying an image inputted through an image input source on an image outputting unit which is located away from the image input source through four signal lines, such as a LAN cable. More specifically, the invention relates to a cable extension unit for outputting sounds to an image output unit in addition to images.

Such kind of a conventional cable extension unit can output a RGB signal which is comprised of color signals (R signal, G signal, B signal) and synchronous signals (horizontal and vertical directions) as an image signal to be inputted from an image input source to an image output unit through four signal lines, such as a LAN cable belonging to Category 5. This unit can display an image inputted through an image input source on an image output unit which is located away therefrom without connecting the image input source and the image output unit with each other with a cable having a BNC (Bayonet Neill Concelman) connector or a DSUB connector, so that effective presentation can be realized, reducing the cost of the cable.

The image input source, such as a PC (personal computer), has a function of displaying a moving image with sounds. In order to realize more effective presentation, it is desirable that sound signals can be outputted to the image output unit together with a RGB signal with the above-mentioned cable extension unit.

The cable between the image input source and the image output unit in the above-mentioned cable extension unit is comprised of four signal lines, so the signal lines are needed to be further increased in order to output a sound signal together with a RGB signal to the image output unit. Then, the above-mentioned LAN cable can not be used, and the cost of the cable increases thereby.

Otherwise, in order to output a sound signal to the image output unit without increasing signal lines, a synchronous signal can overlap a color signal or a sound signal. But, it is difficult to recover the original synchronous signal since a synchronous signal has a polarity, so both signals are mixed with each other with only laying the synchronous signal on the color signal or the sound signal as it is.

Under this situation, the development of the cable extension unit with only four signal lines, such as a LAN cable, for outputting a sound signal to the image output unit together with a RGB signal has been desired.

SUMMARY OF THE INVENTION

The present invention is a cable extension unit having a signal transmitter for receiving input of an image signal (such as a RGB signal, a composite signal, and a component signal) and a signal receiver for outputting the image signal received from the signal transmitter through four signal lines, the signal receiver being connected with the signal transmitter through the four signal lines, the cable extension unit for respectively transmitting color signals R, G, B which comprises a RGB signal to the signal receiver through three signal lines of the four signal lines in case where the image signal inputted into the signal transmitter is the RGB signal:

the signal transmitter comprising:
synchronous signal polarity judging means for judging polarity of a synchronous signal corresponding to the RGB signal inputted into the signal transmitter;
synchronous signal polarity inverting means for inverting polarity of the synchronous signal in case where the synchronous signal polarity judging means judged the polarity of the synchronous signal to be positive;
synchronous signal overlapping and outputting means for operating so the the synchronous signal overlap any color (such as B) signal which comprises the RGB signal inputted into the signal transmitter and for outputting the color signal which the synchronous signal overlapped through the signal line (such as 5C) corresponding to the color signal;
sound signal receiving means for receiving input of a sound signal;
polarity information (polarity data) adding means for adding polarity information of the synchronous signal to a non-data area of the sound signal inputted in the sound signal receiving means; and
sound signal transmitting means for transmitting the sound signal, the polarity information (polarity data) being added thereto by the polarity information adding means, through one (such as 5D) of the four signal lines, through which the RGB signal has not been transmitted, to the signal receiver;

the signal receiver comprising:
synchronous signal separating means for separating the synchronous signal from the color signal (such as $B_P$) which the synchronous signal overlapped by the synchronous signal overlapping and outputting means, the color signal being transmitted from the signal transmitter through the signal line (such as 5C);
polarity information separating means for separating the polarity information from the sound signal, the polarity information being added thereto by the polarity information adding means, the sound signal being transmitted from the signal transmitter through one signal line (such as 5D), through which the RGB signal has not been transmitted;
synchronous signal recovering and outputting means for recovering the synchronous signal inputted in the signal transmitter, corresponding to the RGB signal from the synchronous signal separated by the synchronous signal separating means on the basis of the polarity information separated by the polarity information separating means and for outputting it; and
sound signal outputting means for outputting the sound signal, the polarity information being separated therefrom by the polarity information separating means.

According to this aspect of the invention, the synchronous signal polarity judging means of the signal transmitter judges a polarity of a synchronous signal inputted into the signal transmitter, corresponding to a RGB signal, and the synchronous signal polarity inverting means of the signal transmitter inverts the polarity of the synchronous signal when the synchronous signal polarity judging means judged the polarity of the synchronous signal to be positive. The synchronous signal overlapping and outputting means of the signal transmitter operates so that the synchronous signal overlap any color signal (such as B) inputted into the signal transmitter, comprising the RGB signal, and outputs the color signal which the synchronous signal overlapped through the signal line (such as 5C) corresponding to the color signal (such as B). The sound signal receiving means of the signal transmitter receives input of the sound signal, and the polarity information adding means of the signal transmitter adds the polarity information of the synchronous signal to the non-data area of the sound signal inputted into the sound signal receiving means, and the sound signal transmitting means of the signal transmitter transmits the sound signal on which the polarity information was added by the polarity information adding means to the signal receiver through one signal line (such as 5D) of the four signal lines, through which the RGB signal has not been transmitted.

And, the synchronous signal separating means of the signal receiver separates the synchronous signal from the color signal (such as $B_P$) which the synchronous signal overlapped by the synchronous signal overlapping and outputting means, which has been transmitted from the signal transmitter through the signal line (such as 5C), and the polarity information separating means of the signal receiver separates the polarity information from the sound signal the polarity information being added thereto by the polarity information adding means, which has been transmitted from the signal transmitter through one signal line (such as 5D) through which the RGB signal has not been transmitted. The synchronous signal recovering and outputting means of the signal receiver recovers the synchronous signal inputted into the signal transmitter, corresponding to the RGB signal, from the synchronous signal separated by the synchronous signal separating means on the basis of the polarity information separated by the polarity information separating means and outputs it, and the sound signal outputting means of the signal receiver outputs the sound signal from which the polarity information was separated by the polarity information separating means. With this structure, the cable extension unit can output sound signals to an image output unit (10 as shown in FIG. 1, for instance) together with R, G and B signals which comprises the RGB signal and the synchronous signals corresponding thereto although there are only four signal lines. That is, sounds can be outputted from the image output unit together with the images inputted from the image input source (9 as shown in FIG. 1, for instance) without increasing the cost of the cable, and effective presentation can be realized, thereby.

Besides, another aspect of the invention is the cable extension unit, wherein the sound signal inputted in the sound signal receiving means of the signal transmitter is an analog signal, the signal transmitter has AD converting means for converting the sound signal inputted in the sound signal receiving means into a digital signal, the polarity information adding means of the signal transmitter adds the polarity information of the synchronous signal to the non-data area of the sound signal converted into the digital signal by the AD converting means, the signal receiver has DA converting means for converting the sound signal from which the polarity information has been separated by the polarity information separating means of the signal receiver into an analog signal, and the sound signal outputting means of the signal receiver outputs the sound signal converted into the analog signal by the DA converting means.

According to the above-mentioned aspect of the invention, the AD converting means of the signal transmitter converts the analog sound signal inputted into the sound signal receiving means into the digital signal, and the polarity information adding means of the signal transmitter adds the polarity information of the synchronous signal to the non-data area of the sound signal converted into the digital signal by the AD converting means. The DA converting means of the signal receiver converts the sound signal from which the polarity information was separated by the polarity information separating means of the signal receiver into the analog signal, and the sound signal outputting means of the signal receiver outputs the sound signal converted into the analog signal by the DA converting means. With this structure, the sound signal can be provided with the non-data area to which the polarity information can be added even if the sound signal inputted in the signal transmitter is an analog signal, and images and sounds can be together outputted from the image output unit irrespective of kinds of sound signals (analog signal or digital signal).

Besides, another aspect of the invention is the cable extension unit, wherein a plural number of the sound signals are inputted in the sound signal receiving means of the signal transmitter, the signal transmitter has serial converting means for converting the plural number of sound signals inputted in the sound signal receiving means into a serial signal, the polarity information adding means of the signal transmitter adds the polarity information of the synchronous signal to the non-data area of the sound signal converted into the serial signal by the serial converting means, the signal receiver has sound signal recovering means for recovering the plural number of sound signals from the sound signal from which the polarity information has been separated by the polarity information separating means of the signal receiver, and the sound signal outputting means of the signal receiver outputs the plural number of sound signals recovered by the sound signal recovering means.

According to this aspect of the invention, the serial converting means of the signal transmitter converts plural number of the sound signals inputted into the sound signal receiving means of the signal transmitter into the serial signal, and the polarity information adding means of the signal transmitter adds the polarity information of the synchronous signal to the non-data area of the sound signal converted into the serial signal by the serial converting means. The sound signal recovering means of the signal receiver converts the sound signal from which the polarity information was separated by the polarity information separating means of the signal receiver into the plural number of sound signals, and the sound signal outputting means of the signal receiver outputs the plural number of sound signals recovered by the sound signal recovering means. With this structure, plural number of the sound signals can be transmitted to the signal receiver through one signal line (such as 5D) through which the RGB signal has not been transmitted although plural number of sound signals are inputted in the sound signal receiving means, and the RGB signal and the sound signal can be together outputted to the image output unit without further increasing the four signal lines.

Besides, another aspect of the invention is the cable extension unit, wherein the four signal lines comprise a LAN cable belonging to Category 5.

According to this aspect of the invention, the four signal lines comprise a LAN cable belonging to Category 5, so that it is not necessary to use a BNC cable or a DSUB cable as a transmission line for connecting the signal transmitter and the signal receiver with each other, and the cost for the cables can be reduced because of relatively cheap LAN cable even if the image input source is a personal computer. In addition, the LAN cable is thinner and softer than one of the BNC cable or the DSUB cable, and the cables can be easily used, and the work for the cables is easy, conveniently.

Besides, another aspect of the invention is the cable extension unit, wherein the signal transmitter has synchronous signal separate input judging means for judging as to whether or not the synchronous signal inputted into the signal transmitter, corresponding to an image signal was inputted separately from the image signal, and synchronous signal polarity judgment instructing means for instructing the synchronous signal polarity judging means of the signal transmitter to judge the polarity of the synchronous signal inputted in the signal transmitter, corresponding to the RGB signal when the synchronous signal separate input judging means judged the synchronous signal inputted in the signal transmitter, corresponding to the image signal to be separately inputted from the image signal.

According to this aspect of the invention, the synchronous signal separate input judging means of the signal transmitter judges as to whether or not the synchronous signal inputted into the signal transmitter, corresponding to an image signal was inputted separately from the image signal, and the signal polarity judgment instructing means of the signal transmitter instructs the synchronous signal polarity judging means to judge the polarity of the synchronous signal inputted in the signal transmitter, corresponding to the RGB signal when the synchronous signal separate input judging means judged the synchronous signal inputted in the signal transmitter, corresponding to the image signal to be separately inputted from the image signal. With this structure, the polarity of the synchronous signal is judged only in a case where the inputted image signal is a RGB signal, so that the synchronous signal the polarity of which is negative is laid on a color signal (such as B), and the color signal is transmitted to the signal receiver together with the other color signals. That is, the inputted image signal is transmitted to the signal receiver as it is without executing no overlapping procedure in case where the inputted image signal is a composite signal or a component signal, so that it is not necessary to manually switch the control according to kinds of the image signals, and effective presentation can be realized with a simple operation.

BRIEF DESCRIPTION OF THE DRAWINGS

FIG. 2 is a view showing appearances of a signal transmitter and a signal receiver wherein (a) is a back elevation of the signal transmitter and (b) is a back elevation of the signal receiver;

FIG. 4 is a waveform graph showing a RGB signal wherein (a) shows a waveform per frame, (b) a waveform of a vertical synchronous signal and (c) a waveform of a horizontal synchronous signal; and FIG. 5 is a waveform graph of a color signal which the synchronous signal overlapped wherein (a) shows a waveform of an overlapped vertical synchronous signal, (b) shows a waveform of an overlapped horizontal synchronous signal.

DESCRIPTION OF THE PREFERRED EMBODIMENTS

Figure 1:
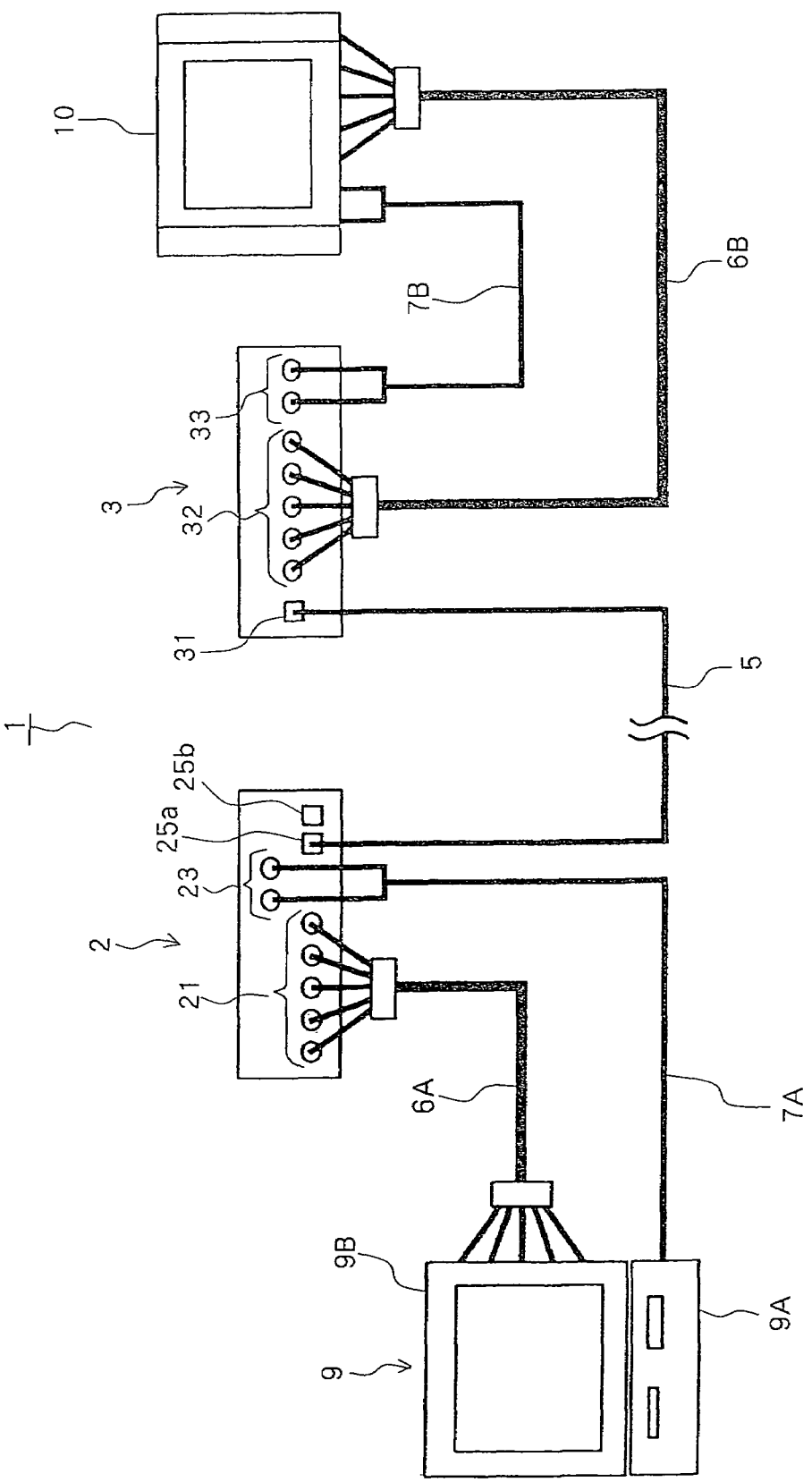
FIG. 1 is a view showing an appearance of a cable extension unit to which the invention is applied.

FIG. 1 shows an appearance of a cable extension unit 1 to which the invention is applied. The cable extension unit 1 has a signal transmitter 2 and a signal receiver 3.

A cable for transmitting a RGB signal is freely connected with the signal transmitter 2. Cables for an image signal are a BNC cable having five BNC (Bayonet Neill Concelman) connectors (not shown) at both ends, a DSUB cable having a DSUB connector (not shown) being comprised of fifteen male pins at both ends, and the like.

An image signal, such as a composite signal (a composite signal of a luminance signal and a color difference signal) and a component signal, such as a YPbPr signal and a YCbCr signal (three signals comprised of a luminance signal and color difference signals) can be also transmitted through the BNC cable.

And, a cable for transmitting a sound signal is freely connected with the signal transmitter 2. The cables for a sound signal are a RCA cable having a RCA pin plug at both ends and the like.

The cable extension unit 1 is provided with a personal computer 9 as an image input source, as shown in FIG. 1. The signal transmitter 2 of FIG. 1 is connected with a main body 9A of the personal computer 9 through a RCA cable 7A, and is connected with a display 9B of the personal computer 9 through a BNC cable 6A. The image input source is not specifically limited to the personal computer 9, but any unit is available as long as an image signal, such as a RGB signal, a composite signal and a component signal, can be transmitted thereby.

A LAN cable having a RJ-45 (Registered Jack-45) modular plug (not shown) at both ends is freely connected with the signal transmitter 2 and the signal receiver 3. The LAN cable is a UTP (unshield Twisted Pair) cable, for instance, which is comprised of four twisted pair lines and the UTP cable is classified into divisions of Category 5 (CAT5) or Category 6 (CAT6) defined by 568 standard of EIA/TIA (Electronic Industries Alliance/Telecommunication Industries Association in the U.S.A.).

The above-mentioned LAN cable is not limited to one classified into the division of EIA/TIA, but may be one belonging to Category 5 or Category 6 which is defined by standard, such as ISO11801, JIS X5150, IEEE 802.3. Besides, the LAN cable is not limited to the UTP, but may be a STP (shielded Twisted Pair) cable. Besides, the above-mentioned Category 5 includes an enhanced Category 5 (CAT5e).

The cable extension unit 1 has a LAN cable 5 belonging to Category 5 (only "the LAN cable 5" hereinafter), as shown in FIG. 1. The signal transmitter 2 and the signal receiver 3 in FIG. 1 are connected with each other through the LAN cable 5. The LAN cable 5 has a predetermined cable length (one hundred meter, for instance). Then, the signal transmitter 2 and the signal receiver 3 which are connected with each other via the LAN cable 5 can be located so that one is the whole length of the cable away from the other.

And, a cable for image signal, such as a BNC cable and a DSUB cable, is freely connected with the signal receiver 3, similar to the signal transmitter 2. Cables for a sound signal are a RCA cable and the like.

The cable extension unit 1 is provided with a plasma display 10 as an image output unit, as shown in FIG. 1. The signal receiver 3 connects with the plasma display 10 via a BNC cable 6B and a RCA cable 7B, for instance. The image output unit is not specifically limited to the plasma display 10, but any unit is available if an image signal, such as a RGB signal, a composite signal and a component signal, can be inputted and displayed thereby.

FIG. 2 is a view showing appearances of the signal transmitter and the signal receiver wherein (a) is a back elevation of the signal transmitter and (b) is a back elevation of the signal receiver.

As shown in FIG. 2(a), the signal transmitter 2 has a housing 20, and the housing 20 is provided with a terminal board 20a. The terminal board 20a has an input terminal for BNC cable 21, an input terminal for DSUB cable 22, and an input terminal for sound signal 23 as input terminals, and output terminals for LAN cable 25a, 25b as output terminals.

The input terminal for BNC cable 21 is comprised of five input terminals for inputting a RGB signal. In the concrete, the input terminal for BNC cable 21 has a R input terminal 21R, a G input terminal 21G, a B input terminal 21B respectively corresponding to a R (red) signal R, a G (green) signal G and a B (blue) signal B which are color signals comprising a RGB signal, and a HD input terminal 21H and a VD input terminal 21V respectively corresponding to a horizontal synchronous signal HD and a vertical synchronous signal VD which are synchronous signals corresponding to the RGB signal.

In the following explanation, the R signal R, the G signal G and the B signal B are referred to as only "the color signals R, G and B" and the horizontal synchronous signal HD and the vertical synchronous signal VD are as only "the synchronous signals HD and VD" if the distinctions are not specifically necessary.

A composite signal can be inputted through any of the R input terminal 21R, the G input terminal 21G and the B input terminal 21B of the above-mentioned input terminal 21 for BNC cable. Besides, a component signal can be inputted through the whole of the three input terminals 21R, 21G and 21B. Then, a signal is inputted in the HD input terminal 21H and the VD input terminal 21V only in case where an image signal is a RGB signal.

A RGB signal can be inputted in the input terminal for DSUB cable 22, similar to the input terminal for BNC cable 21, and the input terminal for DSUB cable 22 is comprised of fifteen input pins 22R, 22G, 22B, 22H, 22V . . . arranged in three rows inside a shell 22a in the shape of "D" character, these input pins being female pins. Detailedly speaking, the input terminal for DSUB cable 22 has the R input pin 22R, the G input pin 22G and the B input pin 22B respectively corresponding to the R, G and B signals, and the HD input pin 22H and the VD input pin 22V respectively corresponding to the horizontal synchronous signal HD and the vertical synchronous signal VD.

Both the input terminal for BNC cable 21 and the input terminal for DSUB cable 22 function as input channels. That is, the signal transmitter 2 has two input channels. And, the signal transmitter 2 has selection switches (not shown) for the input channels on the front side thereof (the back side of FIG. 2) With such a structure, the signal transmitter 2 can output an image signal inputted through any of the input channels with the operation of an operator through the selection switch. The number of the input channels is not limited to two, but may be one, or three or more.

The sound signal input terminal 23 is a RCA pin jack for inputting an analog stereo sound signal, and has a left sound signal input terminal 23L corresponding to a left sound signal LA and a right sound signal input terminal 23R corresponding to a right sound signal RA. In the following explanation, the left sound signal LA and the right sound signal RA are referred to as only sound signals LA and RA if special distinction is not necessary.

The output terminals for LAN cable 25a, 25b are the RJ-45 modular jacks, and has eight poles of contacts (not shown) corresponding to the modular plugs of the LAN cable 5.

As mentioned before, the LAN cable 5 has four twisted pair lines. Each twisted pair lines is comprised of two twisted signal lines for differential transmission for noise reduction. Then, eight signal lines in total respectively correspond to the eight contacts.

In the following explanation, the respective twisted pair lines are regarded as one signal line, and the LAN cable 5 is regarded as a mixture of four signal lines 5A, 5B, 5C and 5D (see FIG. 3) in order to easily understand the invention. Only output contacts 25R, 25G, 25B and 25A (see FIG. 3) respectively corresponding to the signal lines 5A, 5B, 5C and 5D will now be explained concerning the contacts of the output terminals for LAN cable 25a, 25b.

The signal transmitter 2 has distributing means (not shown) for distributing the image signal inputted in the input terminal for BNC cable 21 or in the input terminal for DSUB cable 22 and the sound signal inputted in the sound signal input terminal 23 to the output terminals for LAN cable 25a, 25b. The number of the output terminals for LAN cable 25a, 25b is not limited to two, but may be one, or three or more. Even if the number of the output terminals for LAN cable is changed, the distributing means can distribute the signals to each of the output terminals the number of which is changed.

And, the signal receiver 3 has a housing 30, similar to the signal transmitter 2, as shown in FIG. 2(b), and the housing 30 has a terminal board 30a. The terminal board 30a is provided with an input terminal for LAN cable 31 as an input terminal, and an output terminal for BNC cable 32 and a sound signal output terminal 33 as output terminals.

The input terminal for LAN cable 31 is a RJ-45 modular jack, the same as the output terminals for LAN cable 25a, 25b of the signal transmitter 2, and has eight contacts (not shown) corresponding to the modular plugs of the LAN cable 5. In the following descriptions, only input contacts 31R, 31G, 31B and 31A (see FIG. 3) respectively corresponding to the signal lines 5A, 5B, 5C and 5D of the LAN cable 5 of the eight contacts are explained, similar to the output terminals for LAN cable 25a, 25b.

The output terminal for BNC cable 32 is comprised of five output terminals for outputting a RGB signal, similar to the input terminal for BNC cable 21 of the signal transmitter 2, and has the R output terminal 32R, the G output terminal 32G and the B output terminal 32B respectively corresponding to R, G, B signals, and a HD output terminal 32H and a VD output terminal 32V respectively corresponding to the horizontal synchronous signal HD and the vertical synchronous signal VD.

A composite signal can be outputted through any of the R output terminal 32R, the G output terminal 32G and the B output terminal 32B of the above-mentioned output terminal for BNC cable 32. Besides, a component signal can be outputted through the whole of the three output terminals 32R, 32G and 32B.

The sound signal output terminal 33 is a RCA pin jack for outputting an analog stereo sound signal, similar to the sound signal input terminal 23 of the signal transmitter 2, and has a left sound signal output terminal 33L corresponding to a left sound signal LA and a right sound signal output terminal 33R corresponding to a right sound signal RA.

Figure 3:
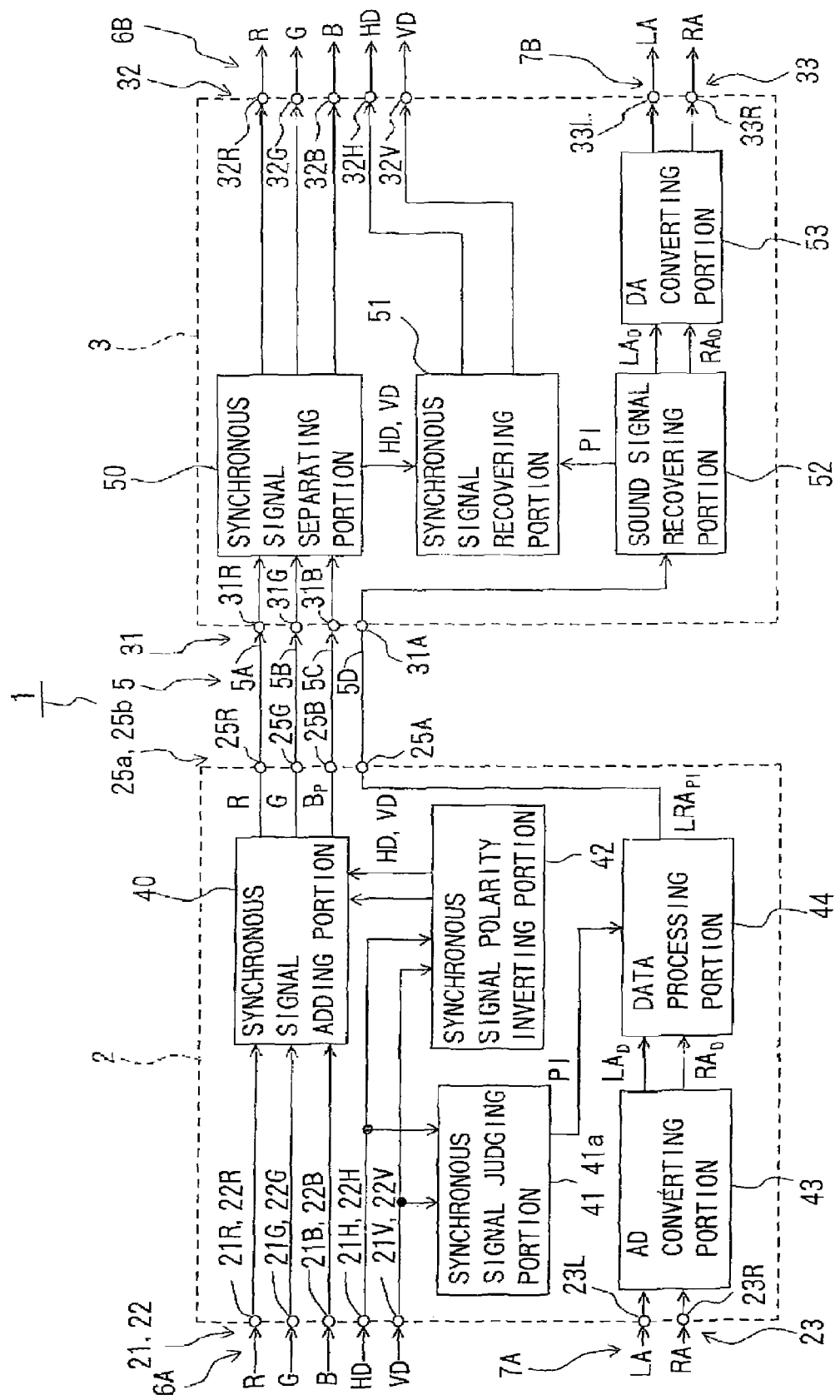
FIG. 3 is a block diagram showing structures of the signal transmitter and the signal receiver.

FIG. 3 is a block diagram showing structures of the signal transmitter 2 and the signal receiver 3. The signal transmitter 2 on the left side of the figure has a synchronous signal adding portion 40, a synchronous signal judging portion 41, a synchronous signal polarity inverting portion 42, an AD converting portion 43 and a data processing portion 44.

The synchronous signal adding portion 40 is connected with the input terminal for BNC cable 21 or the input terminal for DSUB cable 22 through distributing means (not shown). Detailedly speaking, the synchronous signal adding portion 40 is connected with the R input terminal 21R, the G input terminal 21G and the B input terminal 21B if the input terminal for BNC cable 21 is selected as the input channel, and is connected with the R input pin 22R, the G input pin 22G and the B input pin 22B if the input terminal for DSUB cable 22 is selected as the input channel.

The synchronous signal judging portion 41 and the synchronous signal polarity inverting portion 42 are respectively connected with the input terminal for BNC cable 21 or the input terminal for DSUB cable 22 through distributing means (not shown), similar to the synchronous signal adding portion 40. Then, the synchronous signal judging portion 41 and the synchronous signal polarity inverting portion 42 are respectively connected with the HD input terminal 21H and the VD input terminal 21V if the input terminal for BNC cable 21 is selected with a selection switch (not shown), and are respectively connected with the HD input pin 22H and the VD input pin 22V if the input terminal for DSUB cable 22 is selected. Furthermore, the synchronous signal polarity inverting portion 42 is connected with the synchronous signal adding portion 40.

The AD converting portion 43 is connected with the left sound signal input terminal 23L and the right sound signal input terminal 23R which comprises the sound signal input terminal 23, and the AD converting portion 43 and the synchronous signal judging portion 41 are respectively connected with the data processing portion 44.

The synchronous signal adding portion 40 is connected with the output contacts 25R, 25G and 25B of the output terminals for LAN cable 25a, 25b, and the data processing portion 44 is connected with the output contact 25A of the output terminals for LAN cable 25a, 25b.

And, the signal transmitter 3 on the right side of the figure has a synchronous signal separating portion 50, a synchronous signal recovering portion 51, a sound signal recovering portion 52, and a DA converting portion 53. The synchronous signal separating portion 50 is connected with the input contacts 31R, 31G and 31B of the input terminal for LAN cable 31. The sound signal recovering portion 52 is connected with the input contact 31A of the input terminal for LAN cable 31.

The synchronous signal separating portion 50 and the sound signal recovering portion 52 are respectively connected with the synchronous signal recovering portion 51, and the sound signal recovering portion 52 is connected with the DA converting portion 53. The synchronous signal separating portion 50 is connected with the R output terminal 32R, the G output terminal 32G and the B output terminal 32B of the output terminal for BNC cable 32, and the synchronous signal recovering portion 51 is connected with the HD output terminal 32H and the VD output terminal 32V of the output terminal for BNC cable 32. Furthermore, the DA converting portion 53 is connected with the left sound signal output terminal 33L and the right sound signal output terminal 33R which comprise the sound signal output terminal 33.

In order to output images and sounds inputted through the personal computer 9 which is an image input source by the plasma display 10 as an image outputting unit with the cable extension unit 1 having the above-mentioned structure, the personal computer 9, the signal transmitter 2, the signal receiver 3 and the plasma display 10 are connected with each other through predetermined cables.

In this embodiment, the image input source is only personal computer 9 for easy understanding, and then, the personal computer 9 is connected with the signal transmitter 2 through the BNC cable 6A and the RCA cable 7A. And, the image output unit is only plasma display 10, and then, the plasma display 10 is connected with the signal receiver 3 through the BNC cable 6B and the RCA cable 7B, and the signal transmitter 2 and the signal receiver 3 are connected with each other with only the output terminal for LAN cable 25a of the signal transmitter 2 through the LAN cable 5.

Then, the output contact 25R of the output terminal for LAN cable 25a is connected with the input contact 31R of the input terminal for LAN cable 31 through the signal line 5A of the LAN cable 5, as shown in FIG. 3. In a similar way, the output contact 25G is connected with the input contact 31G through the signal line 5B, the output contact 25B is connected with the input contact 31B through the signal line 5C, and the output contact 25A is connected with the input contact 31A through the signal line 5D.

In the above-mentioned state, an operator respectively boots the personal computer 9, the signal transmitter 2, the signal receiver 3 and plasma display 10, selects the input terminal for BNC cable 21 as an input channel with the selection switch (not shown) of the signal transmitter 2, and inputs an instruction of output of image signals and sound signals through input means (not shown) of the personal computer 9.

Then, the color signals R, G, B and the synchronous signals HD, VD are outputted from the main body 9A of the personal computer to the signal transmitter 2 through the display 9B and the BNC cable 6A. And, the sound signals LA, RA synchronizing with the RGB signal are outputted from the main body 9A of the personal computer to the signal transmitter 2 through the RCA cable 7A.

The outputted R signal R, the G signal G and the B signal B are respectively inputted in the synchronous signal adding portion 40 through the R input terminal 21R, the G input terminal 21G and the B input terminal 21B. And, the outputted horizontal synchronous signal HD and the vertical synchronous signal VD are respectively inputted into the synchronous signal judging portion 41 and the synchronous signal polarity inverting portion 42 through the input terminals 21H and 21V. And, the outputted right and left sound signals RA, LA are respectively inputted into the AD converting portion 43 through the right and left sound signal input terminals 23R and 23L.

The synchronous signal judging portion 41 always detects input of signals through both HD input terminal 21H and the VD input terminal 21V with a logical circuit after booting of the signal transmitter 2, and judges as to whether or not the synchronous signals HD, VD have been input on the basis of the detected results.

In case where a composite signal or a component signal is inputted as the image signal of the image input source, for instance, no signal is inputted through the HD input terminal 21H and the VD input terminal 21V, so that the synchronous signal judging portion 41 detects no signal and judges no input of the synchronous signals HD and VD.

When no input of the synchronous signals HD and VD was judged, the synchronous signal judging portion 41 does not judge the polarities of the synchronous signals HD and VD (details are shown hereinafter).

When no synchronous signals HD and VD is inputted, the synchronous signal adding portion 40 for executing adding procedure on the synchronous signals HD and VD (details are shown hereinafter) outputs the inputted composite signal or the inputted component signal to the R output contact 25R, the G output contact 25G and the B output contact 25B of the output terminal for LAN cable 25a as it is without executing the adding procedure. And, the synchronous signal judging portion 41 instructs the synchronous signal separating portion 50 of the signal receiver 3 not to execute separating procedure (details are shown hereinafter) on the synchronous signals HD and VD.

In the present embodiment, the image signal of the image input source is a RGB signal, and the horizontal synchronous signal HD and the vertical synchronous signal VD are inputted into the synchronous signal judging portion 41 through the input terminals 21H, 21V, being separated from the RGB signal, so that the synchronous signal judging portion 41 judges the input of the synchronous signals HD and VD by detecting these signals. The synchronous signal judging portion 41 does not instruct as the case where a composite signal or a component signal is inputted.

The synchronous signals HD and VD have polarities, and the polarities are different from each other according to resolutions of images and kinds of displays. When judging input of the synchronous signals HD and VD, the synchronous signal judging portion 41 instructs a polarity judging portion 41a of the inside circuit to judge as to whether the synchronous signals HD and VD are negative or positive, and the polarity judging portion 41a judges the polarities of the inputted synchronous signals HD and VD.

Explanation of the polarities of the synchronous signals HD and VD is now given, referring to FIG. 4. FIG. 4 is a waveform graph showing a RGB signal wherein (a) shows a waveform per frame, (b) a waveform of a vertical synchronous signal VD and (c) a waveform of a horizontal synchronous signal HD. In FIGS. 4(a) (b) and (c), only B signal B is shown as a color signal, and waveforms of the B signal B, the horizontal synchronous signal HD and the vertical synchronous signal VD are shown in order from top to bottom of each figure.

One period of the vertical synchronous signal VD is one per frame, and the period per frame is from time t0 when a vertical synchronous pulse $VD_P$ is outputted to t10 when the next vertical synchronous pulse $VD_P$ is outputted, as shown in FIG. 4(a). That is, a vertical synchronous pulse $VD_P$ is outputted per period, and the B signals B per frame are outputted always in a positive direction (in the upper direction in the figure) with respect to a ground GND between time 2 and time t10.

FIG. 4(b) shows the vertical synchronous signal VD with time base obtained by enlarging the time base from time t0 to time t2 of FIG. 4(a). For instance, the vertical synchronous pulse $VD_P$ outputted during time t0 and t1 is in the positive direction with respect to the ground GND, and the polarity of the vertical synchronous signal VD is positive. On the other hand, the polarity of the vertical synchronous signal VD is negative if the vertical synchronous pulse $VD_P$ is in the negative direction (in the lower direction in the figure) with respect to the ground GND.

FIG. 4(c) shows the horizontal synchronous signal HD with time base obtained by enlarging the time base from time t2 to time t8 of the FIG. 4(b). One period of the horizontal synchronous signal HD is one per scanning line, and the period per scanning line is from time t2 when a horizontal synchronous pulse $HD_P$ is outputted to t6 when the next horizontal synchronous pulse $HD_P$ is outputted. The horizotal synchronous pulse $HD_P$ is outputted per period, and the B signals B per scanning line are outputted during time t4 and time t5.

For instance, the horizontal synchronous pulse $HD_P$ outputted during time t2 and time t3 is in the positive direction (in the upper direction in the figure) with respect to the ground GND, and the polarity of the horizontal synchronous signal HD is positive. On the other hand, the polarity of the horizontal synchronous signal HD is negative if the horizontal synchronous pulse $HD_P$ is in the negative direction (in the lower direction in the figure) with respect to the ground GND.

The polarity judging portion 41a detects as to whether the vertical synchronous pulse $VD_P$ and the horizontal synchronous pulse $HD_P$ are respectively in the positive direction or the negative direction with respect to the ground GNO, and the judges the polarities of the synchronous signals HD and VD.

The synchronous signal polarity inverting portion 42 executes procedures for inverting the polarities of the synchronous signals HD and VD inputted by an inverter. But, the polarity judging portion 41a instructs the synchronous signal polarity inverting portion 42 not to execute such an inversion procedure if the polarity judging portion 41a judges that the polarities of the synchronous signals HD and VD are negative. Then, the synchronous signal polarity inverting portion 42 outputs the synchronous signals HD and VD, leaving the polarities as they are to the synchronous signal adding portion 40 without inverting the polarities of the inputted synchronous signals HD and VD.

When the polarities of the synchronous signals HD and VD are judged to be positive, the polarity judging portion 41a does not instruct the synchronous signal polarity inverting portion 42 as mentioned above. That is, the synchronous signal polarity inverting portion 42 inverts the polarities of the inputted synchronous signals HD and VD, and outputs the synchronous signals HD and VD the polarities of which were inverted, that is, the synchronous signals HD and VD the polarities of which are negative, to the synchronous signal adding portion 40.

In a word, the synchronous signals HD and VD are outputted from the synchronous signal polarity inverting portion 42 to the synchronous signal adding portion 40 so that their polarities are always inverted into negative. The synchronous signal adding portion 40 executes a procedure for adding on inputted synchronous signals HD and VD if the synchronous signals HD and VD the polarities of which are negative are inputted.

The procedure for adding on the synchronous signals HD and VD is now explained, referring to FIG. 5. FIG. 5 is a waveform graph showing a color signal which the synchronous signal HD, VD overlapped wherein (a) shows a waveform of an overlapped vertical synchronous signal VD, (B) shows a waveform of an overlapped horizontal synchronous signal HD. In FIGS. 5(a), (b), the B signal B and $B_P$ before and after the synchronous signals HD and VD overlap the B signal B are shown in order from top to bottom of each figure.

The B signal B as shown in the upper hand of FIG. 5(a) before the synchronous signal HD, VD overlap corresponds a waveform obtained by enlarging A portion of FIG. 4(a). Then, times t20, t21 and t22 of FIG. 5(a) correspond to times t0, t1 and t2 of FIG. 4(a), (b).

The synchronous signal adding portion 40 operates so that the vertical synchronous signal VD received from the synchronous signal polarity inverting portion 42 the polarity of which is negative can overlap any of the color signals R, G, B so as to synchronize these signals (that is, fixing time axis) with an addition circuit for instance. When the vertical synchronous signal VD in the lower hand of FIG. 4(b) overlaps the B signal B, the vertical synchronous signal VD and the B signal B are composed so as to make one signal, the B signal $B_P$ as shown in the lower hand in FIG. 5(a), and the vertical synchronous pulse $VD_P$ inverted in the negative direction is added on the B signal $B_P$ between times t20 and t21.

FIG. 5(b) shows the waveform obtained by enlarging the waveform after time t22 of FIG. 5(a) with time axis the same as one of FIG. 4(c). That is, times t22, t23, . . . t29 of FIG. 5(a) correspond to times t2, t3 . . . t9 of FIG. 4(a).

Similar to the case of the vertical synchronous signal VD, the synchronous signal adding portion 40 operates so that the horizontal synchronous signal HD received from the synchronous signal polarity inverting portion 42 the polarity of which is negative can overlap any of the color signals R, G, B so as to synchronize these signals (that is, fixing time axis) with an addition circuit for instance. When the horizontal synchronous signal HD in the lower hand of FIG. 4(c) overlaps the B signal B, the horizontal synchronous signal HD and the B signal B are composed so as to make one signal, the B signal $B_P$, which the horizontal synchronous signal HD overlapped, as shown in the lower hand in FIG. 5(b), and the horizontal synchronous pulse $HD_P$ inverted in the negative direction is added on the B signal $B_P$ between times t20 and t21, between times t26 and t27 and between times t28 and t29.

The color signal which the synchronous signal HD, VD overlaps is not specifically the B signal B, but may be the R signal R or the G signal G. Besides, it is not necessary to always operate so that both horizontal synchronous signal HD and the vertical synchronous signal VD overlap the same color signal (such as the B signal B), but the horizontal synchronous signal HD may overlap the R signal R and the vertical synchronous signal VD may overlap the G signal G.

After both horizontal synchronous signal HD and the vertical synchronous signal VD overlapped the B signal B by the synchronous signal adding portion 40 so as to produce one combined B signal $B_P$, the portion 40 outputs the R signal R, the G signal G and the B signal $B_P$, which both synchronous signal HD and VD overlapped, to the output contacts 25R, 25G and 25B of the output contact 25a for LAN cable, respectively.

As already mentioned, the sound signals LA, RA has been inputted into the AD converting portion 43 together with the RGB signal. The sound signals LA, RA are analog signals. The AD converting portion 43 quantizes the inputted sound signals LA, RA according to a predetermined sampling frequency so as to be converted into digital signals of binary numeral, and outputs the converted sound signals ("digital sound signals $LA_D$ and $RA_D$" hereinafter) to the data processing portion 44. The data processing portion 44 converts the inputted digital sound signals $LA_D$ and $RA_D$ into a sound signal ("the serial sound signal $LRA_D$" hereinafter).

In the concrete, the data processing portion 44 arranges the left digital sound signal $LA_D$ and the right digital sound signal $RA_D$ in a predetermined order in one sampling. Any of the digital sound signals $LA_D$ and $RA_D$ may be first, but in the setting in this embodiment, the left digital sound signal $LA_D$ is arranged and next the right digital sound signal $RA_D$ is arranged. A set of sound data is comprised of the digital sound signals $LA_D$ and $RA_D$ which were arranged corresponding to one sampling. The data processing portion 44 thus arranges the digital sound signals $LA_D$ and $RA_D$ in order, and seriates the above-mentioned digital sound signals $LA_D$ and $RA_D$.

And, the digital sound signals $LA_D$ and $RA_D$ in one sampling are respectively shown with a predetermined bit length (sixteen bits, for instance). Time width per bit can be set relatively short according to capacities of the signal transmitter 2 and the signal receiver 3 irrespective of the sampling frequency. Then, the serial sound signal $LRA_D$ is provided with an area having no sound data ("the non-data area NDA" hereinafter) between the digital sound signals $LA_D$ and $RA_D$ or between two sets of sound data, and the data processing portion 44 sets a specific pattern showing a period for each sampling in the non-data area NDA.

And, the synchronous signal judging portion 41 (the polarity judging portion 41a) judges the polarities of the inputted synchronous signals HD and VD, as already mentioned, and at the same time, outputs a signal "1" (in case of a positive polarity) and a signal "0" (in case of a negative polarity) as polarity information (polarity data) PI of the synchronous signals HD and VD corresponding to the judged result to the data processing portion 44. The data processing portion 44 adds the inputted polarity information PI to the non-data area NDA of the serial sound signal $LRA_D$. The data processing portion 44 thus outputs a sound signal $LRA_{PI}$ being added the polarity information PI thereto to the output contact 25A of the output terminal for LAN cable 25a.

When effectively making use of the non-data area NDA of the digital sound signals $LA_D$, $RA_D$, the polarity information PI for recovering the sound signal on the signal receiver 3 side (described hereinafter) and the digital sound signal $LA_D$, $RA_D$ can be composited into one signal. Besides, the other data excluding the polarity information PI can be also added to the non-data area NDA. That is, any data which can be represented with a digital signal, such as ON-OFF information of the image input source and information of the input channel selected by a selection switch, can be added.

The sound signals LA, RA inputted into the signal transmitter 2 are not limited to analog signals, but maybe digital signals. In case of a digital signal, AD conversion by the AD converting portion 43 is not necessary, so the structure of the signal transmitter 2 can be made simple. And, the sound signals LA, RA inputted into the signal transmitter 2 are not limited to stereo signals, but may be monaural signals. Furthermore, they are not limited to two sound signals, such as a stereo signal, but may be three or more sound signals, such as "DOLBY" stereo®.

The R signal R, the G signal G, the B signal $B_P$ which the synchronous signals HD, VD overlapped and the sound signal $LRA_{PI}$ the polarity information PI being added thereto are thus respectively outputted from the output contacts 25R, 25G, 25B, 25A which comprises the output terminal for LAN cable 25a to the signal receiver 3.

The R signal R, the G signal G, the B signal $B_P$ which the synchronous signals HD, VD overlapped are inputted into the synchronous signal separating portion 50 of the signal receiver 3 through the signal lines 5A, 5B and 5C of the LAN cable 5 and the input contacts 31R, 31G and 31B of the input contact for LAN cable 31. And, the sound signal $LRA_{PI}$ the polarity information PI being added thereto is inputted into the sound signal recovering portion 52 of the signal receiver 3 through the signal line 5D of the LAN cable 5 and the input contact 31A of the input contact for LAN cable 31.

The synchronous signal separating portion 50 separates (processes for separating) the synchronous signals HD, VD from the B signal $B_P$ which the synchronous signals HD, VD overlapped. In the concrete, a comparator detects the horizontal synchronous signal HD and the vertical synchronous signal VD by comparing with a predetermined voltage value (such as a half of the voltage of the synchronous signal HD or VD), and thereafter, a clipping circuit removes the synchronous signals HD, VD the polarities of which are negative from the B signal $B_P$ which the synchronous signals HD, VD overlapped.

The synchronous signals HD, VD can be thus easily separated from the B signal $B_P$ which the synchronous signals HD, VD overlapped with the above-mentioned simple structure and no complex circuit since the relation between the polarities of the synchronous signals HD, VD and the B signal B are inversive with respect to the ground GND.

Subsequently, the synchronous signal separating portion 50 outputs the separated synchronous signals HD, VD the polarities of which are negative to the synchronous signal recovering portion 51. On the other hand, the sound signal recovering portion 52 separates the polarity information PI from the non-data area NDA of the serial sound signal $LRA_{PI}$ and outputs the separated polarity information PI to the synchronous signal recovering portion 51.

The synchronous signal recovering portion 51 recovers the synchronous signals HD, VD which were inputted into the signal transmitter 2 from the synchronous signals HD, VD the polarities of which are negative, the signals being received from the synchronous signal separating portion 50 on the basis of the polarity information PI which was received from the sound signal recovering portion 52. For instance, the synchronous signal recovering portion 51 inverts the polarities of the synchronous signals HD, VD in case where the polarity information PI is one (1), that is, the polarity is positive. On the contrary, the recovering portion 51 does not invert the polarities of the synchronous signals HD, VD in case where the polarity information PI is zero (0) that is, the polarity is negative.

After the sound signal recovering portion 52 separated the polarity information PI from the non-data area NDA of the serial sound signal $LRA_{PI}$, the sound signal $LRA_{PI}$, the polarity information PI being separated therefrom is separated into the left digital sound signal and the right digital sound signal on the basis of a specific pattern provided in the non-data area NDA so as to recover the digital sound signals $LA_D$, $RA_D$.

The sound signal recovering portion 52 outputs the recovered digital sound signals $LA_D$, $RA_D$ to the DA converting portion 53, and the DA converting portion 53 recovers the analog sound signals LA, RA at the time when both were inputted into the signal transmitter 2 by converting the inputted digital sound signals $LA_D$, $RA_D$ into analog signals.

The synchronous signal separating portion 50 thus outputs the R signal R, the G signal G, and the B signal $B_P$ the synchronous signals HD, VD being separated therefrom, that is, the B signal B to the R output contact 32R, the G output contact 32G and the B output contact 32B of the output contact for BNC cable 32 of the signal receiver 3, respectively. And, the synchronous signal recovering portion 51 outputs the recovered horizontal synchronous signal HD and the vertical synchronous signal VD to the HD output contact 32H and the VD output contact 32V of the output contact for BNC cable 32, respectively. Besides, the DA converting portion 53 outputs the recovered sound signals LA, RA to the left sound output contact 33L and the right sound output contact 33R which comprises the sound output contact 33 of the signal receiver 3, respectively.

Then, the color signals R, G, B and the synchronous signals HD, VD are inputted into the plasma display 10 through the BNC cable 6B and the sound signals LA, RA are inputted into the display 10 through the RCA cable 7B. The plasma display 10 can display proper synchronous images since the synchronous signals HD, VD are inputted into the display 10 keeping the polarities at the time when the signals HD, VD were inputted into the signal transmitter 2, as mentioned before. Besides, the plasma display 10 can output sounds together with the images since the sound signals LA, RA synchronizing with the RGB signal are also inputted into the plasma display 10.

In case where a composite signal or a component signal is inputted as an image signal of the image input source, the synchronous signal judging portion 41 of the signal transmitter 2 instructs the synchronous signal separating portion 50 not to execute the above-mentioned separating procedure, as explained before. So, the synchronous signal separating portion 50 outputs the inputted composite signal or the inputted component signal to the plasma display 10 through the R output contact 32R, the G output contact 32G, the B output contact 32B as it is without executing the separating procedure.

The cable extension unit 1 according to the invention can also transmit both sound signals LA, RA in addition to five signals, that is, the color signals R, G, B and the synchronous signals HD, VD from the image input source to the image output unit which is some distance away therefrom although only four signal lines, such as the LAN cable 5, are used, so that effective presentation with both images and sounds can be realized.

Besides, the LAN cable 5 comprised of four signal lines, for instance, can be used, so that the BNC cable or the DSUB cable is unnecessary. In the end, the cost for the cable can be reduced. In addition, the LAN cable 5 has the cable diameter thinner and then softer than the. BNC cable and the DSUB cable, so that the cables can be easily used and cable work can be also easy.

In the above-mentioned embodiment, the cable for connecting the signal transmitter 2 and the signal receiver 3 with each other is the LAN cable 5. But, any cable is available as long as it has four signal lines. But, twisted pair lines, such as the LAN cable 5, are preferable in the aspect of noise reduction.

In the present embodiment of the invention, the image input source and the signal transmitter 2 are connected with each other through the BNC cable 6A. Even if both are connected with each other through a DSUB cable, the invention can be of course applied.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. A cable extension unit having a signal transmitter for receiving input of an image signal and a signal receiver for outputting said image signal received from said signal transmitter through four signal lines, said signal receiver being connected with said signal transmitter through said four signal lines, said cable extension unit for respectively transmitting color signals R, G, B which comprises a RGB signal to said signal receiver through three signal lines of said four signal lines in case where said image signal inputted into said signal transmitter is said RGB signal:

said signal transmitter comprising:
synchronous signal polarity judging means for judging polarity of a synchronous signal corresponding to said RGB signal inputted into said signal transmitter;
synchronous signal polarity inverting means for inverting polarity of said synchronous signal in case where said synchronous signal polarity judging means judged said polarity of said synchronous signal to be positive;

synchronous signal overlapping and outputting means for operating so that said synchronous signal overlap any color signal which comprises said RGB signal inputted into said signal transmitter and for outputting said color signal which said synchronous signal overlapped through said signal line corresponding to said color signal;

sound signal receiving means for receiving input of a sound signal;

polarity information adding means for adding polarity information of said synchronous signal to a non-data area of said sound signal inputted in said sound signal receiving means; and sound signal transmitting means for transmitting said sound signal, said polarity information being added thereto by said polarity information adding means, through one of said four signal lines, through which said RGB signal has not been transmitted, to said signal receiver;

said signal receiver comprising:

synchronous signal separating means for separating said synchronous signal from said color signal which said synchronous signal overlapped by said synchronous signal overlapping and outputting means, said color signal being transmitted from said signal transmitter through said signal line;

polarity information separating means for separating said polarity information from said sound signal, said polarity information being added thereto by said polarity information adding means, said sound signal being transmitted from said signal transmitter through said one signal line, through which said RGB signal has not been transmitted;

synchronous signal recovering and outputting means for recovering said synchronous signal inputted in said signal transmitter, corresponding to said RGB signal from said synchronous signal separated by said synchronous signal separating means on the basis of said polarity information separated by said polarity information separating means and for outputting it; and sound signal outputting means for outputting said sound signal, said polarity information being separated therefrom by said polarity information separating means.

2. The cable extension unit according to claim 1, wherein said sound signal inputted in said sound signal receiving means of said signal transmitter is an analog signal, said signal transmitter has AD converting means for converting said sound signal inputted in said sound signal receiving means into a digital signal, said polarity information adding means of said signal transmitter adds said polarity information of said synchronous signal to said non-data area of said sound signal converted into said digital signal by said AD converting means, said signal receiver has DA converting means for converting said sound signal from which said polarity information has been separated by said polarity information separating means of said signal receiver into an analog signal, and said sound signal outputting means of said signal receiver outputs said sound signal converted into said analog signal by said DA converting means.

3. The cable extension unit according to claim 1, wherein a plural number of said sound signals are inputted in said sound signal receiving means of said signal transmitter, said signal transmitter has serial converting means for converting said plural number of sound signals inputted in said sound signal receiving means into a serial signal, said polarity information adding means of said signal transmitter adds said polarity information of said synchronous signal to said non-data area of said sound signal converted into said serial signal by said serial converting means, said signal receiver has sound signal recovering means for recovering said plural number of sound signals from said sound signal from which said polarity information has been separated by said polarity information separating means of said signal receiver, and said sound signal outputting means of said signal receiver outputs said plural number of sound signals recovered by said sound signal recovering means.

4. The cable extension unit according to claim 1, wherein said four signal lines comprise a LAN cable belonging to Category 5.

5. The cable extension unit according to claim 1, wherein said signal transmitter has synchronous signal separate input judging means for judging as to whether or not said synchronous signal inputted into said signal transmitter, corresponding to an image signal was inputted separately from said image signal, and synchronous signal polarity judgment instructing means for instructing said synchronous signal polarity judging means of said signal transmitter to judge said polarity of said synchronous signal inputted in said signal transmitter, corresponding to said RGB signal when said synchronous signal separate input judging means judged said synchronous signal inputted in said signal transmitter, corresponding to said image signal to be separately inputted from said image signal.

* * * * *